United States Patent
Joy et al.

(10) Patent No.: US 9,225,538 B2
(45) Date of Patent: Dec. 29, 2015

(54) STATELESS APPLICATION NOTIFICATIONS

(75) Inventors: George Joy, Kirkland, WA (US); Cheuk Wan William Lau, Bellevue, WA (US); Darren Louie, Bellevue, WA (US); Yosef Firstenberg, Redmond, WA (US); Ravikant Cherukuri, Snoqualmie, WA (US); Kevin Michael Woley, Seattle, WA (US); Matthew R. Ayers, Seattle, WA (US); Gaurav S. Anand, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 13/224,217

(22) Filed: Sep. 1, 2011

(65) Prior Publication Data

US 2013/0061046 A1 Mar. 7, 2013

(51) Int. Cl.
*H04L 12/18* (2006.01)
*H04L 29/08* (2006.01)
*H04L 29/06* (2006.01)
*H04L 12/58* (2006.01)

(52) U.S. Cl.
CPC .......... *H04L 12/1859* (2013.01); *H04L 67/146* (2013.01); *H04L 67/20* (2013.01); *H04L 67/26* (2013.01); *H04L 12/587* (2013.01); *H04L 63/0428* (2013.01); *H04L 63/0807* (2013.01); *H04L 63/164* (2013.01)

(58) Field of Classification Search
CPC combination set(s) only.
See application file for complete search history.

(56) References Cited

U.S. PATENT DOCUMENTS

| | | | |
|---|---|---|---|
| 7,701,974 B2 | 4/2010 | Mayer et al. | |
| 2002/0143984 A1* | 10/2002 | Hudson Michel | 709/238 |
| 2002/0157024 A1* | 10/2002 | Yokote | 713/201 |
| 2002/0161884 A1* | 10/2002 | Munger et al. | 709/224 |
| 2003/0055975 A1* | 3/2003 | Nelson et al. | 709/227 |

(Continued)

FOREIGN PATENT DOCUMENTS

WO WO-0233516 4/2002

OTHER PUBLICATIONS

Michael Reed, Paul F. Syverson, and David M. Goldschlag, Anonymous Connections and Onion Routing, May 1998, IEEE Journal on Selected Areas in Communications, vol. 16, No. 4.*

(Continued)

*Primary Examiner* — Taghi Arani
*Assistant Examiner* — Phy Anh Vu
(74) *Attorney, Agent, or Firm* — Bryan Webster; Kate Drakos; Micky Minhas (57) ABSTRACT

Stateless application notifications are described that enable third parties to provide messages to client applications. A communication channel can be established between a notification service and an application. Upon request, the notification service can generate obfuscated routing data for the channel, which can be in the form of a channel handle or token. The routing data can be encrypted and digitally signed to obscure the content and format of the routing data from third parties. An application service possessing the obfuscated routing data can package a notification with the data and send the package to the notification service for delivery. The application service does so without knowing the channel particulars encoded by the obfuscated routing data. The notification service that produces the obfuscated routing data can decrypt and interpret the data, and deliver the notification on the channel to an appropriate endpoint application on behalf of the application service.

20 Claims, 7 Drawing Sheets

(56) References Cited

U.S. PATENT DOCUMENTS

| | | |
|---|---|---|
| 2003/0061481 A1* | 3/2003 | Levine et al. ............... 713/163 |
| 2003/0163689 A1* | 8/2003 | Xu et al. ................... 713/163 |
| 2003/0182443 A1* | 9/2003 | Wang et al. ................ 709/238 |
| 2003/0198192 A1* | 10/2003 | Tani ....................... 370/254 |
| 2004/0003116 A1* | 1/2004 | Munger et al. .............. 709/245 |
| 2004/0024880 A1* | 2/2004 | Elving et al. ............... 709/227 |
| 2004/0103205 A1* | 5/2004 | Larson et al. ............... 709/229 |
| 2004/0107285 A1* | 6/2004 | Larson et al. ............... 709/229 |
| 2004/0196292 A1* | 10/2004 | Okamura .................... 345/581 |
| 2005/0157706 A1* | 7/2005 | Wang et al. ................ 370/352 |
| 2005/0172120 A1* | 8/2005 | Wang et al. ................ 713/160 |
| 2005/0198029 A1* | 9/2005 | Pohja et al. ................ 707/8 |
| 2005/0198170 A1* | 9/2005 | LeMay et al. ............... 709/206 |
| 2005/0268309 A1* | 12/2005 | Krishnaswamy et al. ........ 719/330 |
| 2005/0270970 A1* | 12/2005 | Patrick et al. .............. 370/216 |
| 2005/0286412 A1* | 12/2005 | Hao et al. .................. 370/216 |
| 2005/0289348 A1* | 12/2005 | Joy et al. .................. 713/172 |
| 2006/0034179 A1* | 2/2006 | Carter et al. ............... 370/241 |
| 2006/0059091 A1* | 3/2006 | Wang et al. ................. 705/50 |
| 2006/0123134 A1* | 6/2006 | Munger et al. .............. 709/245 |
| 2006/0129650 A1* | 6/2006 | Ho et al. ................... 709/207 |
| 2006/0167975 A1* | 7/2006 | Chan et al. ................. 709/203 |
| 2007/0038740 A1 | 2/2007 | Steeves |
| 2007/0165597 A1* | 7/2007 | Chaturvedi et al. ........... 370/351 |
| 2007/0245414 A1* | 10/2007 | Chan et al. ................. 726/12 |
| 2009/0158397 A1 | 6/2009 | Herzog et al. |
| 2009/0196292 A1* | 8/2009 | Mimura et al. .............. 370/392 |
| 2009/0285118 A1 | 11/2009 | Yoshikawa et al. |
| 2010/0088387 A1 | 4/2010 | Calamera |
| 2010/0144383 A1 | 6/2010 | Berger et al. |
| 2010/0227632 A1 | 9/2010 | Bell et al. |
| 2011/0066851 A1* | 3/2011 | Bello et al. ................ 713/166 |
| 2012/0167160 A1* | 6/2012 | Carney et al. ............... 726/1 |
| 2012/0311691 A1* | 12/2012 | Karlin et al. ............... 726/12 |

OTHER PUBLICATIONS

"International Search Report", Mailed Date: Dec. 26, 2012, Application No. PCT/US2012/053025, Filed Date: Aug. 30, 2012, pp. 7.

"Foreign Office Action", CN Application No. 201210317566.8, Aug. 18, 2014, 11 pages.

Goldschlag, et al., "Hiding Routing Information", Retrieved at <<http://cryptome.org/jya/hri.htm>>,Information Hiding, First International Workshop, 1996, pp. 137-150.

"Apple Push Notification Service", Retrieved at <<http://developer.apple.com/library/ios/#documentation/NetworkingInternet/Conceptual/RemoteNotificationsPG/ApplePushService/ApplePushService.html>>, Retrieved Date: May 31, 2011, pp. 10.

"Services/Notifications/Specification/POSTOffice", Retrieved at <<https://wiki.mozilla.org/Services/Notifications/Specification/POSTOffice>>, Retrieved Date: May 31, 2011, pp. 3.

"Apple Push Notification Service Programming Guide", Retrieved at <<http://translated.by/you/apple-push-notification-service-programming-guide/original/>>, Nov. 14, 2009, pp. 7.

"Foreign Office Action", CN Application No. 201210317566.8, Mar. 13, 2015, 12 pages.

"Extended European Search Report", EP Application No. 12829096.2, Jul. 2, 2015, 12 pages.

"Foreign Office Action", CN Application No. 201210317566.8, Sep. 8, 2015, 8 Pages.

* cited by examiner

STATELESS APPLICATION NOTIFICATIONS

BACKGROUND

In a client-server environment where a service provider implements a notification service on the server-side to deliver messages to clients, the service can be configured to process and deliver notification messages to clients on behalf of third parties. In some traditional approaches, the messaging can be based on client state data such as addresses, routing data, account data, authentication data and/or other state data that is maintained persistently by a service provider on the server-side for numerous clients.

Maintaining such client state data for numerous clients, though, can be expensive because resources (e.g., memory and processing capacity) that could otherwise be enlisted by the service provider for other purposes are tied up for storage and management of the state data. Moreover, it is inefficient and wasteful to persistently store state data at the service provider for clients that may connect infrequently and/or may connect one time and then never reconnect again. In addition, a centralized store can be a security risk as a target for hackers to obtain client data and notifications are dependent upon the reliability of a single centralized store.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide stateless application notifications designed to enable third parties to provide notifications to client applications. In at least some embodiments, a notification service establishes a communication channel for a client application and generates obfuscated routing data that can be employed to direct notifications to the application on the channel. In some embodiments, the routing data can be configured as a channel handle that is derived as an abstraction of the channel pathway or address. The channel handle or other suitable routing data can also be encoded as a token that is encrypted and digitally signed, such that the content and format of the token is obscured from third parties and protected from tampering.

An application service possessing the obfuscated routing data in some form can package a notification with the data and send the package to the notification service for delivery. The application service can use the obfuscated routing data to direct notifications to the channel without understanding the obfuscated routing data or knowing the pathway/address for the channel. The notification service that produces the obfuscated routing data can decrypt and interpret the obfuscated routing data, verify signatures contained within the data to prevent tampering, and deliver the notification on the channel to an appropriate endpoint application on behalf of the application service.

BRIEF DESCRIPTION OF THE DRAWINGS

The same numbers are used throughout the drawings to reference like features.

DETAILED DESCRIPTION

Overview

Stateless application notifications are described that enable third parties to provide messages to client applications. A communication channel can be established between a notification service and an application. Upon request, the notification service can generate obfuscated routing data for the channel, which can be in the form of a channel handle or token. The routing data can be encrypted and digitally signed to obscure the content and format of the routing data from third parties and prevent tampering. An application service possessing the obfuscated routing data can package a notification with the data and send the package to the notification service for delivery. The application service does so without knowing the channel particulars encoded by the obfuscated routing data. The notification service that produces the obfuscated routing data can decrypt and interpret the data, and deliver the notification on the channel to an appropriate endpoint application on behalf of the application service.

In the discussion that follows, a section titled "Operating Environment" is provided and describes one environment in which one or more embodiments can be employed. Following this, a section titled "Stateless Application Notification Examples" describes example details of stateless application notifications in accordance with one or more embodiments. Next, a section titled "Example Methods" describes example techniques for stateless application notifications in accordance with one or more embodiments. Last, a section titled "Example System" describes example computing systems and devices that can be utilized to implement one or more embodiments.

Operating Environment

Figure 1:
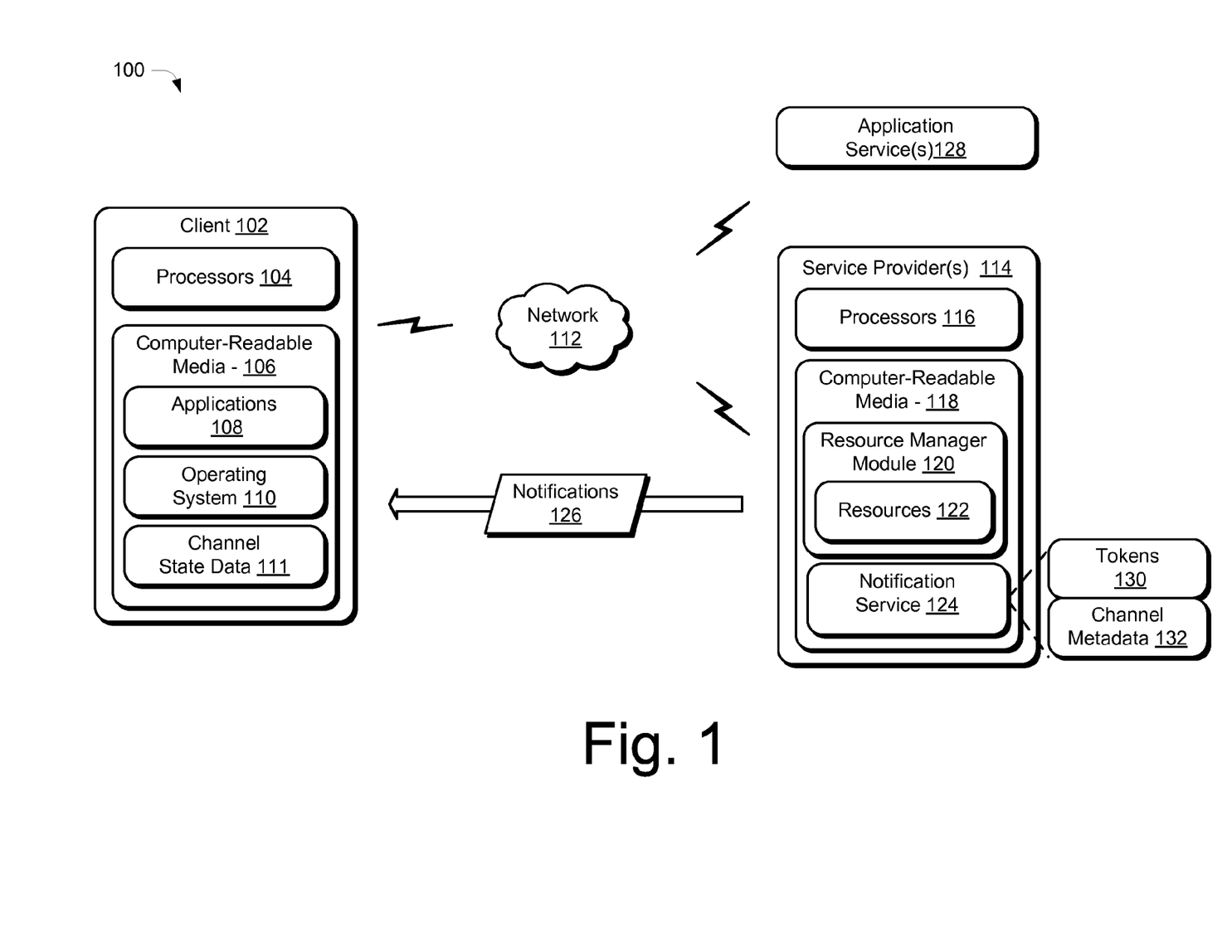
FIG. 1 illustrates an operating environment in which various principles described herein can be employed in accordance with one or more embodiments.

FIG. 1 illustrates an operating environment in accordance with one or more embodiments, generally at 100. Environment 100 includes a client 102 having one or more processors 104, one or more computer-readable media 106 and one or more applications 108 and an operating system 110 that reside on the computer-readable media and which are executable by the processor(s). The client 102 can be embodied as any suitable computing system and/or device such as, by way of example and not limitation, a desktop computer, a portable computer, a tablet or slate device, a handheld computer such as a personal digital assistant (PDA), a cell phone, a set-top box, and the like. One example of a computing system that can represent various systems and/or devices including the client 102 is shown and described below in FIG. 7.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media", examples of which can be found in the discussion of the example computing system of FIG. 7.

In addition, client 102 includes channel state data 111 that can be employed to facilitate stateless notifications as described above and below. The channel state data 111 relates to delivery pathways or "channels" that can be established between a client 102 and a notification service to provide notifications for applications 108 of the client. The channel state data 111 can include identifiers, routing data, tokens, authorization data, and expiration data related to one or more channels, to name a few examples. Clients 102 can cache their own channel state data 111 to enable stateless processing on the server-side.

As further depicted in FIG. 1, the client 102 can be communicatively coupled over a network 112, such as the Internet, with one or more service providers 114 which provide various resources (e.g., content and services), as described above and below. By way of example, the client 102 can interact with the service provider 114 and exchange messages to create channels and employ the channels to obtain notifications.

The service providers 114 are each depicted as having one or more processors 116 and one or more computer-readable media 118. The service provider 114 is further depicted as including a resource manager 120. The resource manager 120 represents functionality operable by a service provider 114 to manage various resources 122 that may be made available over the network 112. For example, various resources 122 can be provided via web pages or other user interfaces that are communicated over the network for output by the client 102. The resource manager 120 can manage access to the resources 122, performance of the resources 122, configuration of user interfaces or data to provide the resources 122, and so on.

The service provider 114 can provide one or more web servers and/or sites, which a client 102 can navigate to in order to access the resources 122. The resources 122 can include any suitable combination of services and/or content typically made available over a network by one or more providers. Some examples of services include, but are not limited to, a search service, an email service to send and receive email, an instant messaging service to provide instant messages between clients 102, and a social networking service to facilitate connections and interactions between groups of users who share common interests and activities. Content may include various combinations of text, video, ads, audio, multi-media streams, animations, images, web pages, web applications, device applications, content for display by a browser or other device application, and the like.

In addition, the service provider 114 can include or otherwise make use of a notification service 124 that is representative of functionality operable to manage communication of notifications 126 between the client 102 and other entities. The notification service 124 can be operated alone and/or in conjunction with other services to provide functionality for one or more different types of messaging. By way of example and not limitation, the multiple different types of messaging provided by the notification service can include email, text messages, application and/or operating system notifications, in application content, social networking notices and invites, instant messaging, voice messages, peer-to-peer messaging, and so forth.

The notification service 124 is also operable to implement techniques for stateless application notifications described herein. In particular, the notification service 124 can be implemented to facilitate communication of notifications 126 to the client 102 on behalf of one or more application services 128. The notifications 126 can be configured as messages that are directed to applications 108 corresponding to the application services, such as promotions, application updates, alerts, in-app features, and so forth. The notification service 124 is responsible for routing and delivering the notifications 126 to clients 102. Channel state data 111 cached by a client 102 can be obtained on demand by the notification service 124 if necessary. However, the notification service 124 can perform "stateless" processing for channels and notifications on the server-side using obfuscated routing data that is provided with notification requests. The notification service 124 may temporarily store state information regarding clients when they are currently connected. The state data can include the currently-connected client's identifying information, information about what kinds/types of notifications to allow or block, and so forth. When the client disconnects, though, temporary state data may be discarded by the Notification Service 124 and therefore the processing is considered "stateless".

As discussed in greater detail below, notifications 126 can be delivered on a channel that is established between the client 102 and the service provider 114. Notifications can be sent over the channel by associating the notifications with obfuscated routing data, such as a channel handle or token that is provided through the notifications service 124. In one example approach to providing notifications via channels, the notification service 124 can employ tokens 130 configured to carry channel metadata 132. The channel metadata 132 can represent data used "in process" by the notification service 124 to process requests, establish channels, route notifications, and so forth. This can include various channel state data 111 that is obtained as needed from clients 102. The notification service 124, though, does not necessarily cache the channel metadata 132 on behalf of clients 102.

Various data related to channels can be included as part of channel metadata 132 including a channel ID, channel handles, and routing data. The channel ID uniquely identifies a channel and is maintained such that the channel ID is not exposed to third parties. The third parties, though, are able to employ channel handles generated for a channel and provided in a token or otherwise to direct messages through the notification service 124 to endpoints without interpreting the handle or knowing the corresponding channel ID. In particular, a channel handle can be derived as an abstraction of the channel ID to obscure the properties of the channel. Details regarding these and other aspects of channels, channel handles, and stateless application notifications are provided in relation to the following figures.

Having described an example operating environment, consider now a discussion of some stateless application notifications examples in accordance with one or more embodiments.

Stateless Application Notification Examples

This section describes example details regarding stateless application notifications in accordance with one or more embodiments. In the discussion that follows, first a sub-section titled "Channels for Notification Delivery" describes channels that can be established to facilitate application notifications. Next a sub-section titled "Stateless Tokens" provides details regarding tokens that can be employed in some embodiments to carry routing data used for routing notifications to appropriate endpoints using the channels. Thereafter, example interactions between a service provider 114, a client 102, and an application service 128 to implement stateless application notifications are discussed in relation to example operational scenarios depicted in FIGS. 2 and 3.

Channels for Notification Delivery

As introduced above, notifications can be delivered on a channel that is established between the client 102 and the service provider 114. Generally speaking, a channel is a representation of a delivery pathway (e.g., address) for notifications from an application service 128 to a particular endpoint. An endpoint as used herein corresponds to a unique combination of a particular user, device, and/or application. In other words, a channel can be considered a communication pathway that is established for and associated with a particular application 108 installed on particular client 102 and used by a particular user of the client 102. The channels are a mechanism by which a globally unique address can be assigned to an endpoint application.

Each channel can have a corresponding channel identifier (ID). The channel ID is a persistent identifier uniquely identifying a delivery pathway to a corresponding endpoint. To secure a channel and prevent attackers from hijacking or misusing the channels, the channel ID can be kept obscured. In at least some embodiments, the channel ID is maintained securely by the client 102 and is not exposed to third parties. For instance, the channel IDs for one or more applications 108 can be configured as parameters/objects that are internal to the operating system 110. The operating system 110 can make use of the channel ID in interactions with the notification service 128, but otherwise keeps the channel ID private.

Thus, to enable notifications on a channel, channel handles are created that can be issued to third parties in lieu of exposing and/or using the channel ID itself. When notifications are activated for an application, such as upon installation or execution of the application, a channel can be established which can be used to update application specific content. In one approach, the application can request issuance of a channel handle through the operating system 108. For example, a request can be made through a local application programming interface (API). The operating system can in turn interact with the notification service 124 to cause the notification service 124 to issue a channel handle and return the channel handle to the application 108. The notification service 124 can also establish a new channel if a channel does not already exist. The application 108 can then distribute the channel handle to an application service 128 to enable corresponding notifications from the application service 128.

More particularly, a channel handle can be derived as an abstraction of the channel ID for distribution to applications and third parties. The channel handle can be constructed by the notification service 124 in response to a request from a client. The request from a client can be configured to contain a channel ID and other client state data 111 that is used by the notification service 124 to create a corresponding channel handle. The handle obfuscates the properties of the channel and can be encrypted to prevent modification of the handle. Digital signatures can also be used to prevent modification or tampering. The notification service 124 is responsible for creating the channel handle and also controls the format and content of the channel handle. Thus, the handle's format and content can be obscured from both the client 102 and/or third party application service 128. In this manner, the channel handle can be configured such that the handle is interpretable by the notification service 124 and not interpretable by other parties.

Channel handles can be formatted in any suitable way. In general, the channel handle is configured to represent a pathway or address to an endpoint application. Thus, a channel handle can encode various routing data for a channel. By way of example and not limitation, the notification service 124 can create channel handles as uniform resource identifiers (URIs) that encode a combination of identifiers for a particular application, client device, and user of the client device. More generally, a channel handle can represent any combination of routing data that is sufficient to identify and route a notification to a corresponding endpoint. The handle can be created based on an underlying channel ID and therefore the notification service 124 is able to interpret the handles and deliver notifications sent using the handles on appropriate channels to corresponding endpoints.

Multiple channel handles can be issued for a particular channel ID. Thus, expired or compromised channel handles can be de-authorized without affecting the underlying channel ID. Channel handles can also be configured to have a limited lifetime by associating the channel handles with an expiration time. After the expiration time, the channel handle can no longer be used to deliver notifications. An application, though, can request issuance of a new channel handle on the same channel. Channel handles can also be renewed prior to expiration to provide uninterrupted delivery of notifications to a channel. When a channel handle is renewed, the notification service 124 provides a new handle that can be used as a replacement for the previous handle on the same channel. Multiple channel handles can be active for a channel at the same time. Further details regarding handle renewal are discussed in relation to the following example methods.

The channel itself can remain open indefinitely and many channel handles can be assigned to the channel over the lifetime of the channel. A channel can be explicitly closed, at which point any channel handles associated with the closed channel will no longer be usable for sending notifications. Data maintained by the client 102 controls such decommissioning of a channel. Decommissioning of a channel is a matter of removing the channel ID from the client 102 permanently, such that any use of a handle associated with that channel ID will be rejected by the client 102 since the channel ID no longer exists. A new channel ID would then be issued to represent a new channel established for a particular application 108. Accordingly, persistent channels can be established upon which multiple limited use channel handles can be issued to enable communications via the channels while protecting the channel from being attacked or otherwise compromised.

Stateless Tokens

As mentioned, the channel state data 111 cached by the client 102 can enable stateless delivery of notifications by the notification service 124 using the channels. Rather than storing state data on behalf of clients, the notification service 124 is able to "look-up" or otherwise be provided with channel state data 111 from the client 102 as needed. Therefore the service provider 114 can avoid costs associated with storing the state data. Thus, clients 102 can be configured to cache some or all of their own channel state data 111 and provide the data to the service provider 114 as needed. Data related to channels obtained from a client or otherwise is represented as channel metadata 132 in FIG. 1.

In operation, tokens 130 can be used to pass channel metadata 132 that is encrypted and digitally signed through the notification service 124. The tokens 130 can be considered stateless since the channel metadata 132 used to generate the tokens 130 can be "in process" data that is obtained by the notification service 124 from clients 102 as needed and may not actually be stored persistently by the service provider 114.

Tokens 130 can be configured in various ways. Generally, the token 130 includes routing data configured in a specific format that is interpretable by the notification service 124 and can be used to route notifications that use the tokens to corresponding endpoints. By way of example, a token 130 can be configured as BLOB (binary large object) that is packaged with select channel metadata 132 as a payload. A variety of other token configurations are also contemplated. A token 130 for example can be configured to include a URI or other suitable channel handle. Tokens 130 can also be configured to include security information such as versioning data, authentication data, expiration times, and/or other security information used to control and verify the validity of tokens. The security information enables the use of different secret keys and/or different formats for different token versions. Further, the token can be encrypted and/or digitally signed to prevent tampering. In some embodiments, the notification service 124 alone is able to decrypt and interpret the token 130 and route notifications accordingly to an endpoint specified by channel metadata 132 (e.g., the channel handle or other routing data) contained in the token.

In some embodiments, channel metadata 132 encrypted within the token 130 can include routing data directly. The routing data enables the notification service 124 to statelessly process and route messages to endpoints using the self-contained information that is passed in a token 130. Routing data can include by way of example, version data, a channel handle, identifiers for a corresponding application 108, client 102, and/or machine, a digital certificate, a public key used for encryption, and so forth. Because the notification service 124 issues the tokens, the notification service 124 is able to interpret messages sent using the tokens, decrypt tokens 130 to obtain channel metadata 132 (e.g., using a private key), verify routing data contained in the token, and route notifications to appropriate channels.

In some cases, notification routing can occur "in process" using a channel handle and/or other suitable routing data that is contained within the token 130 itself. Additionally or alternatively, the notification service 124 can "look-up" an appropriate endpoint based on information contained in the token. For example, the notification service 124 can match a channel handle provided in a token to a channel ID and route the message to a corresponding endpoint. Thus, tokens 130 as just described provide one example mechanism by which a notification service 124 can statelessly deliver notifications to applications 108 on behalf of application services 128.

Figure 2:
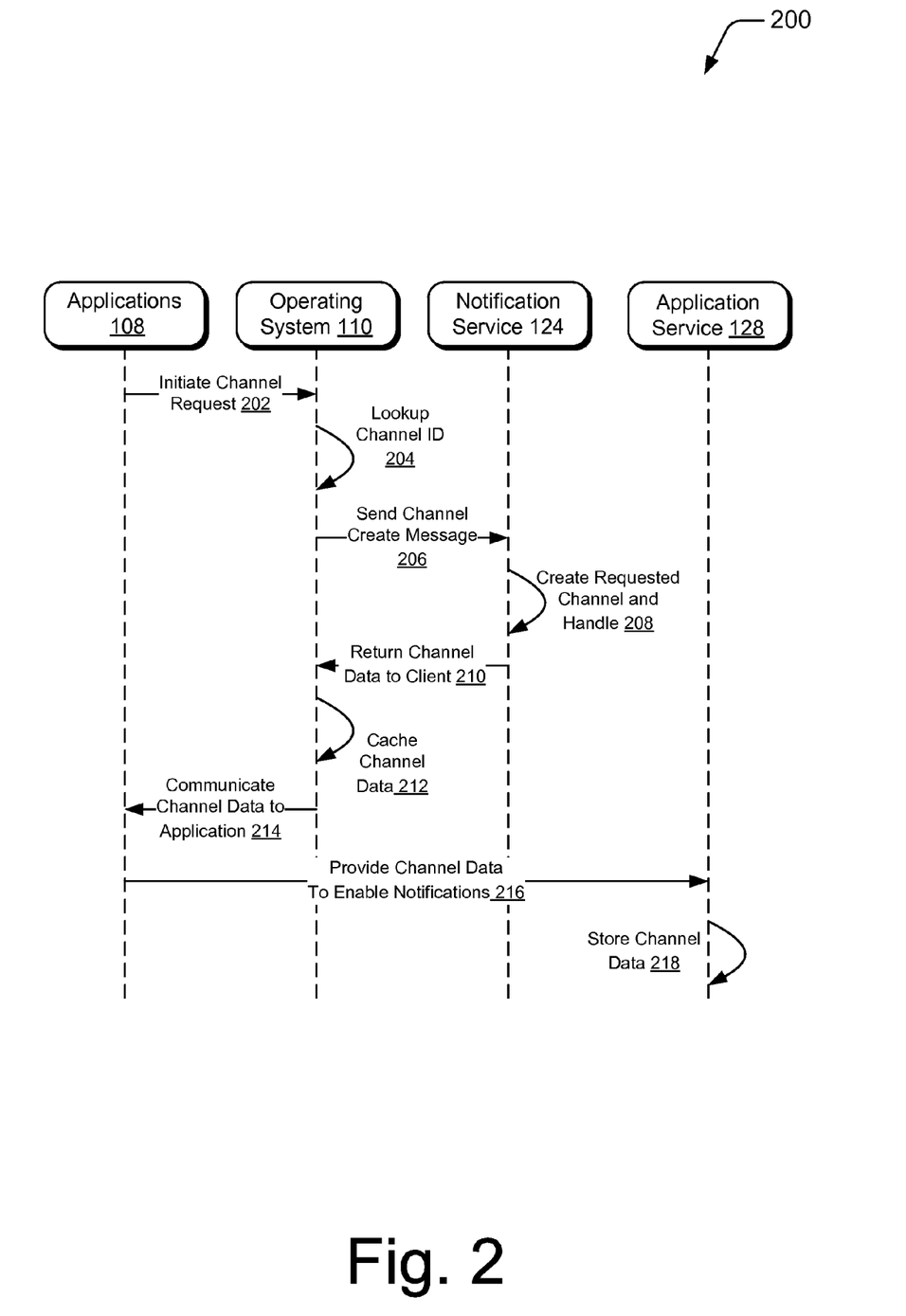
FIG. 2 illustrates an example scenario for creating channels and channel handles in accordance with one or more embodiments.
Figure 3:
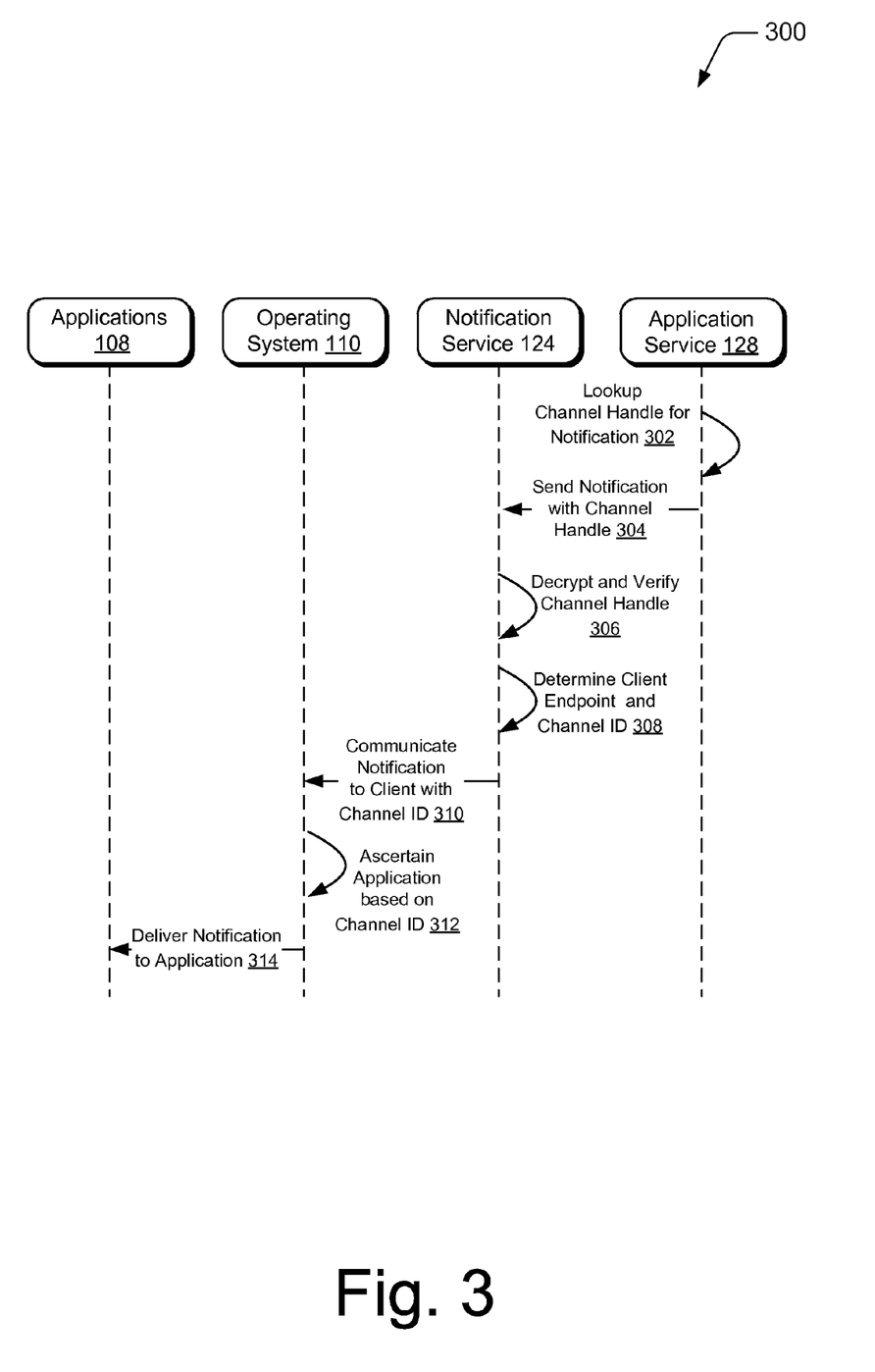
FIG. 3 illustrates an example scenario to employ channel handles to deliver notifications in accordance with one or more embodiments.

In the context of the forgoing discussion of channels and stateless tokens, consider now some example operational scenarios depicted in FIGS. 2 and 3. In particular, FIG. 2 depicts a diagram 200 showing an example sequence of transactions to provide channel handles for stateless application notifications. FIG. 3 depicts a diagram 300 showing an example sequence of transactions involved in employing a channel handle to deliver a notification through a notification service 124.

Referring to the example of FIG. 2, an example scenario 200 illustrates acts involved in creation of channels and channel handles. At 202 an application 108 can initiate a channel request. For instance, the application can initiate the request when the application is installed or executed, when a user activates notification, or otherwise upon activation to obtain notifications. The request causes processing by a computing device 102 to provide an appropriate response having channel data that can be used by the application 108 to enable notifications. In some embodiments, the channel request and response can be processed through a local application programming interface (API) provided by the operating system 110.

In response to the request, at 204 the operating system 110 can look-up an existing channel ID for the application. If a channel exists, then the existing channel ID can be provided with the request. The operating system 110 can also decide based on a policy whether or not to request creation of a new channel handle or use an existing channel handle. If a channel does not already exist, a request can be made to create a new channel.

At 206, the operating system 110 packages application specific information and/or the channel ID into a create channel message and sends the create channel message to the notification service 124. The application information can include routing data and/or other channel state data 111 that can be used by the notification service 124 to create a channel handle and/or issue a token 130 as discussed previously.

At 208, the notification service 124 can create the requested channel in response to the channel request if appropriate. Additionally or alternatively, the notification service 124 can create a new channel handle for the channel. In some embodiments, the notification service 124 forms a token 130 as discussed above to contain the channel handle and/or routing data sufficient to direct notifications to the channel indicated by the channel ID in the request, or for a newly created channel. The token 130 can be encrypted and digitally signed by the notification service 124.

At 210, the notification service 124 returns channel data to the operating system 110 of the client 102. The channel data returned can include the channel handle, a token when tokens are employed, obfuscated routing data and/or a new channel ID if appropriate. Because the returned channel data contains information to route notifications, the notification service 124 can discard the request and corresponding information without caching data on behalf of clients. Subsequent processing of a channel handle and/or token can occur statelessly using channel data provided back in a notification message. Generally, this processing occurs "in process" using the provided channel data and without looking-up additional state data for a channel. However, the notification service 124 can look-up or request additional channel state data 111 from a client in some scenarios.

At 212, the operating system 110 caches the returned channel data. This can involve creating a mapping between channel IDs and application endpoints. As noted, the channel ID and the mapping can be kept private by the operating system 110. Accordingly, the operating system 110 can extract the channel ID and keep the channel ID and mapping secret. At 214, though, other channel data can be provided back to the application 108 to facilitate notifications. This can include providing a channel handle, a token having a handle, and/or other channel data related to the channel back to the application 108.

To enable notifications on the channel, at 216 the application 108 provides appropriate channel data to a corresponding application service 128. Again this can include a channel handle, a token, and/or other channel data that can be employed by the application service 128 to route messages back to the application. At 218, the application service can store the channel data for subsequent use to deliver notifications back to the application.

It should again be noted, that both the application 108, operating system 110, and application service 128 may be unaware of the format and content of the handle or token used for notifications. The application 108, operating system 110, and application service 128 may not be configured to interpret, decrypt, or otherwise process the handle or token. Rather, the application 108 and application service 128 are configured to understand that a given handle and/or token can be used to deliver notifications to a corresponding endpoint through the notification service 124. In one approach, a notification is attached by the application service 128 as a payload to a handle/token and communicated to the notification service 124 that performs processing to route and deliver the notification. Details regarding using a handle/token to deliver notifications are discussed just below in relation to FIG. 3.

In particular, FIG. 3 depicts one example scenario 300 for employing a channel handle to deliver a notification through a notification service 124. The channel handle can be provided individually or be contained within a token 130. In either case the channel handle is protected by being encrypted and/or signed digitally. In this example, the channel handle represents encoded routing data that can be interpreted by the notification service and used to deliver notifications to the correct endpoints. Such routing data can be contained within an encrypted and signed token as mentioned previously.

An application service 128 can produce a notification related to a particular application. The notification can be configured to provide an application update, in application content, a promotion or special offer, a warning, and so forth. The notification can be a global message that is directed to any endpoint having the particular application or a message targeted to one or more specific endpoints based on selection criteria such as device type, user criteria, platform, and so forth.

At 302, the application service looks-up a channel handle for a notification. For instance, the application service 128 can cache channel handles for one or more endpoints having the particular application (or selection criteria) and for which notifications are activated. Thus, the application service 128 can refer to the cached data to match the notification to appropriate channel handles.

At 304, the notification is sent to the notification service 124. The notification can be attached as a payload to the channel handle. In the case of delivery to multiple endpoints, the notification can be associated with multiple channel handles corresponding to the endpoints.

At 306, the notification service 124 processes the notification, which can include decrypting the channel handle and verifying the validity of the channel handle. For instance, the notification service 124 can decrypt the channel handle and/or a token 130 containing the channel handle using a decryption key. This enables the notification service 124 to obtain encoded routing data sufficient to deliver the notification. The notification service 124 can also check to make sure the channel handle has not expired or been revoked and that the corresponding channel is still active.

Further, the notification service 124 can authenticate the application service 128 by requesting the application service 128 to sign-in with pre-determined credentials (e.g., a secret key, password/ID, or other shared secret) before permitting notifications. The pre-determined credentials can be matched to credentials included within channel handles provided by the application service 128. A comparison is made and if the credentials do not match, the notification delivery may be rejected. In order to enable the credential comparison, the channel handles may be tied to a specific identity for authentication at the time the handles are created. This may be accomplished by the notification service 124 embedding credentials, provided from the client 102 by the operating system 110 or otherwise, into the handle at the time the handle is created.

Assuming the channel handle is valid, the notification service 124 interprets the channel handle to determine where to send the notifications. In particular, at 308 the notification service 124 determines a client endpoint and corresponding channel ID using the channel handle. For example, the channel handle can be processed by the notification service 124 to reconstruct the channel ID. In another approach, the channel handle can be used as a reference to look-up a corresponding channel ID. In the case of a token, routing data encoded within the token may be sufficient to directly route the notification after the token is decrypted and verified.

In any case, the notification service 124 identifies where to send the notification and at 310 communicates the notification to the client 102. For example, a communication referencing a channel ID can be directed to the operating system 108 of the client 102. At 312, the operating system 108 performs processing to ascertain an application 108 to which the notification is directed based on the channel ID. One way this can occur is through a local API of the operating system 108. When the appropriate application 108 is identified, the notification is delivered to the application 108 at 314. The application 108 can process the notification and perform any responsive actions dictated by the notification accordingly. For instance, the application 108 can present the notification for viewing within a user interface, perform or schedule an update, provide an alert and/or visual indicator regarding the notification, store the notification, and so forth.

Having considered some examples of stateless application notifications, consider now example procedures for stateless application notifications in accordance with one or more embodiments.

Example Methods

Figure 4:
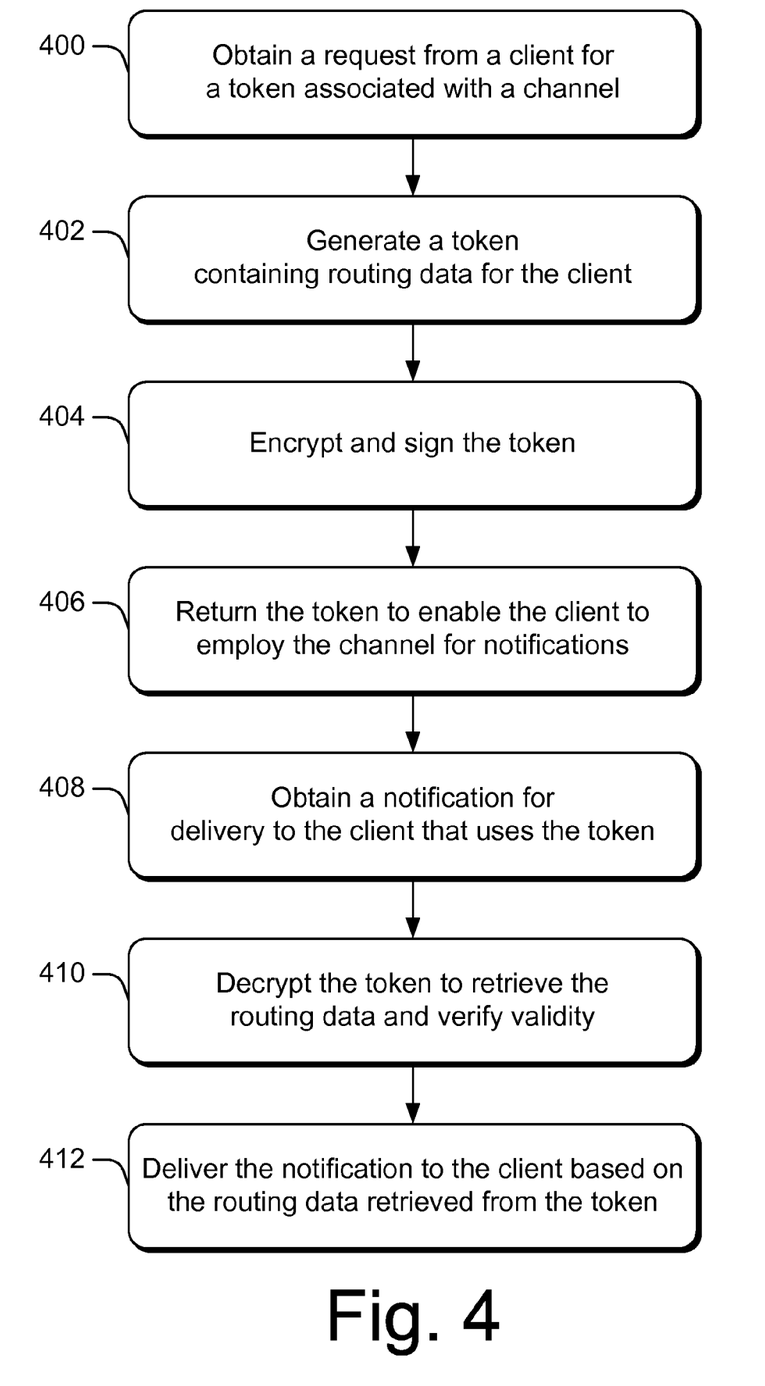
FIG. 4 is a flow diagram that describes steps of a method in accordance with one or more embodiments.

FIG. 4 is a flow diagram that describes steps of a method in accordance with one or more embodiments. The method can be implemented in connection with any suitable hardware, software, firmware, or combination thereof. In at least some embodiments, the method can be implemented by way of a suitability configured computing device, such as the example service provider 114 of FIG. 1 that includes or otherwise makes use of notification service 124.

Step 400 obtains a request from a client for a token associated with a channel. For example, upon activation of an application to receive notifications, the application can send a channel request as described previously. The request can include client state data 111 that can be used to create a token for a particular application of a client 102. The notification service 124 can receive and process the request to create a channel and/or obfuscated routing data that can be used to access an existing channel.

In particular, step 402 generates a token containing routing data for the client. The routing data can be in the form of a channel handle or other combination of client state data 111 that encodes the particulars of the channel. Effectively, the routing data encodes a delivery pathway or address for the channel that can be recovered later by the notification service 124 to route notifications 126. The routing data can be provided as part of a token produced by the notification service 124. The token can be created and employed statelessly using the client state data 111 provided in the request. The token can be configured to contain routing data sufficient to enable the notification service 124 to later determine a pathway or address for the channel "in-process" based on the token alone without looking-up data from a table, database, or external source. The token can also include an expiration time, security data, and other metadata.

Step 404 encrypts and signs the token. This protects the token and obfuscates the routing data from third parties. Step 406 returns the token to the client to enable the client to employ the channel for notifications. The token can be provided through the operating system 110 to an application 108, which can in turn distribute the token for use by an application service 128.

Step 408 obtains a notification for delivery to the client that uses the token. For instance, the notification service 124 can obtain a notification from an application service 128 that is packaged or otherwise associated with a token.

Step 410 decrypts the token to retrieve the routing data and verify the validity of the routing data. Because the notification service 124 issues the token and controls the security of the token, the notification service 124 is able to decrypt and interpret the token. The notification service 124 can also verify the validity of routing data by checking the expiration time, making sure that the channel is active, ensuring that notifications are enabled for the channel, and otherwise checking various security information.

An error handling process can be initiated if a problem with the routing data or token is discovered. An error message can be sent back to a sender of the notification and other corrective actions can be performed such as reissuing a token, sending an error notice to the client, locking a channel, de-authorizing the sender and so forth. Otherwise, when the routing data is valid, the notification service can process the decrypted routing data to reconstruct a channel ID or otherwise identify a channel described by the routing data. Then, step 412 delivers the notification to the client based on the routing data retrieved from the token.

Figure 5:
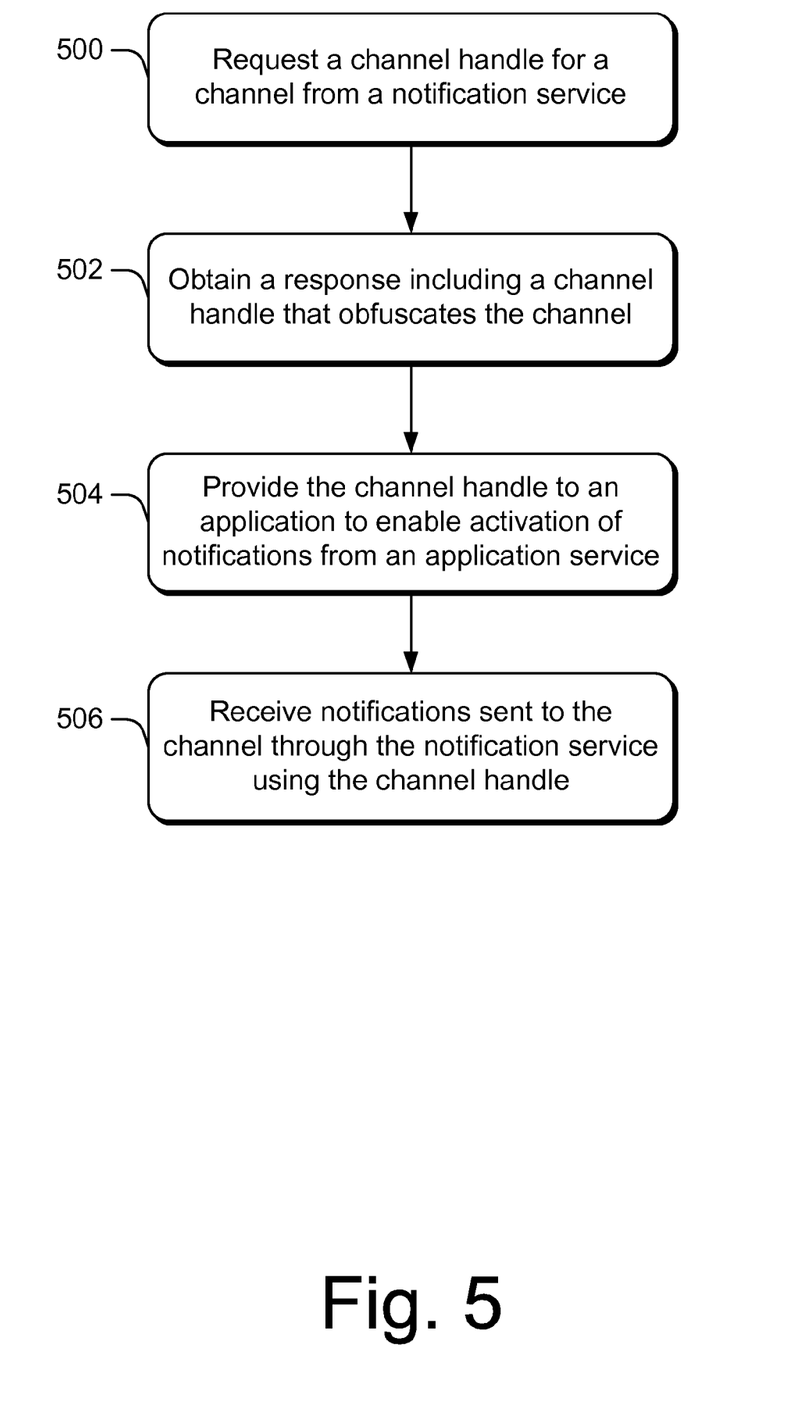
FIG. 5 is a flow diagram that describes steps of another method in accordance with one or more embodiments.

FIG. 5 is a flow diagram that describes steps of another method in accordance with one or more embodiments. The method can be implemented in connection with any suitable hardware, software, firmware, or combination thereof. In at least some embodiments, the method can be implemented by way of a suitability configured computing device, such as the example client 102 of FIG. 1. For instance, the method can be implemented by way of a local application programming interface (API) of the operating system 108 adapted to enable client-side techniques for stateless application notifications.

Step 500 requests a channel handle for a channel from a notification service. A channel handle for a particular channel can be requested for an application at various times. This can occur when an application is initially installed, upon execution of the application, or when notifications are activated by a user or otherwise. The operating system 110 can process the application request through an API as discussed previously.

When an application calls the operating system 108 to obtain the channel handle, the operating system 108 can determine based on a policy whether to provide a previously cached handle (if available) or to request a new handle. A new handle can be requested for example when there is not an existing handle, when a cached handle has expired, when it is appropriate to obtain a new channel, and so forth.

A new handle can be requested to renew a handle before it expires. This can occur for example based on a policy that dictates timing for obtaining renewed handles (or tokens). For renewal, a handle is requested on a pre-existing channel. A new handle can be issued for the pre-existing channel. As mentioned multiple handles can be active for a channel at the same time. Thus, previously created handles for a channel can continued to be used after renewal so long as the handles have not expired, been revoked, or otherwise been deactivated. After renewal though, the application can distribute the newest handle for use with subsequent notifications.

It should be noted that renewal can also be initiated by an application service 128 to renew handles or tokens maintained by the application service 128 individually or as a group. This enables the application service 128 to periodically refresh routing data for channels to ensure continuity of notifications. The renewal occurs through the notification service 124 and the renewed data can be communicated back to the requesting application service 128. The notification service 124 can also provide the renewed handles or tokens to appropriate clients 102.

Step 502 obtains a response including a channel handle that obfuscates the channel. For example, notification service 124 can return the requested channel handle back to the client 102. The channel handle can incorporate obfuscated routing data that can be interpreted by the notification service 124. In addition, a channel ID can be included with the response. The client 102 can cache the returned data (e.g. handle, token, routing data, channel ID) for subsequent use.

Step 504 provides the channel handle to an application to enable activation of notifications from an application service. A cached channel handle or a newly created handle can be provided to an application upon request. The application can then communicate the channel handle to a corresponding application service 128 to activate notifications. An application service 128 that possesses the channel handle is able to direct notification to the corresponding channel through the notification service 124 without actually understanding the obfuscated routing data encoded by the channel handle as discussed above and below.

Step 506 receives notifications sent to the channel through the notification service using the channel handle. Notifications can be communicated to the client 102 from the notification service. The notifications can be received and processed by the operating system 108 and/or a local API as discussed herein. In particular, the notification service 124 interprets and routes the notifications on behalf of the application service 128 using the channel handle. Clients 102 can therefore can receive various notifications through the notification service 124 on respective channels established for the clients 102. Notifications can be processed, stored, and/or output at the client 102 in various way as described previously.

Figure 6:
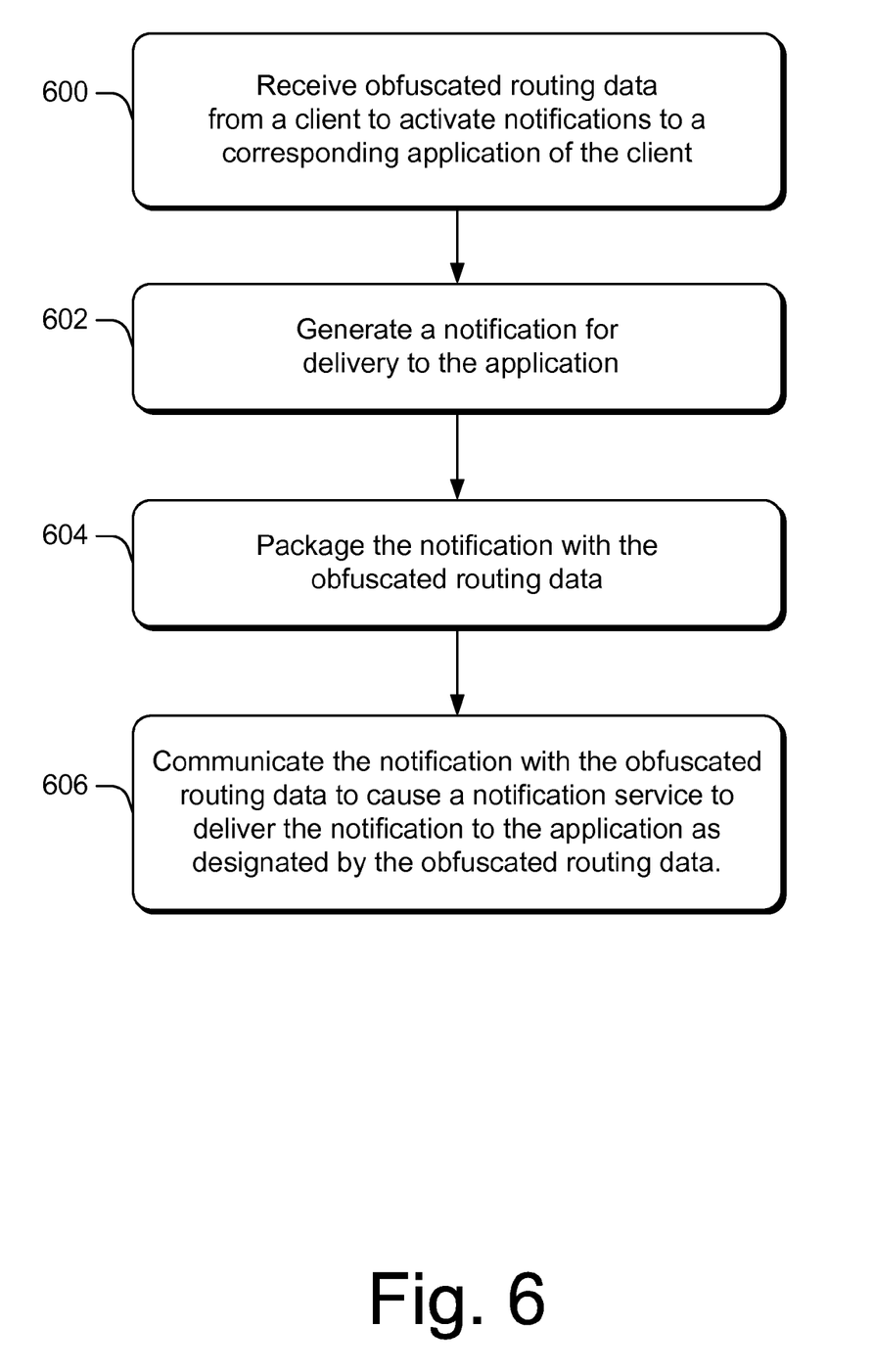
FIG. 6 is a flow diagram that describes steps of another method in accordance with one or more embodiments.

FIG. 6 is a flow diagram that describes steps of a method in accordance with one or more embodiments. The method can be implemented in connection with any suitable hardware, software, firmware, or combination thereof. In at least some embodiments, the method can be implemented by way of a suitability configured computing device, such as by one or more servers configured to provide the example application service 128 of FIG. 1.

Step 600 receives obfuscated routing data from a client to activate notifications to a corresponding application of the client. For instance, an application service 128 can obtain and store a channel handle, token, or other obfuscated routing data from an application 108. The obfuscated routing data enables the service to send notifications to the application 108 over a corresponding channel. The channel itself can be obscured from the application service 128 in the manner discussed herein.

Step 602 generates a notification for delivery to the application. Notifications can be configured as messages for delivery to a particular applications. The notifications can include program updates, in application content, promotions, alerts, links, rewards, achievement messages, and so forth.

Step 604 packages the notification with obfuscated routing data. In particular, the application service 128 can create a package that contains the notifications and is addressed to a channel by including the obfuscated routing data in the package. For example, an application update can be packaged with a channel URI, handle, token, or other routing data issued for a channel. The notification can be considered a payload that is attached to or otherwise associated with delivery instructions represented by the obfuscated routing data contained in the package.

Step 606 communicates the notification with the obfuscated routing data to cause a notification service to deliver the notification to the application as designated by the obfuscated routing data. Note again that the application service 128 can use the obfuscated routing data to direct messages to endpoints without necessarily knowing the details of the routing data or the actual address of the endpoint encoded therein. The package of a notification with obfuscated routing data is configured by the application service 128 to take advantage of the service provided by the notification service 124. The notification service 124 is responsible for decrypting the obfuscated routing data and delivering the notification accordingly. Thus, the application service 128 can simply make use of obfuscated routing data in various forms to direct notifications and turns processing over to the notification service 124 to identify the correct endpoints and route the notifications.

Having considered various example methods for stateless application notifications, consider now an example system that can be employed to implement various aspects of stateless application notifications in accordance with one or more embodiments.

Example System

Figure 7:
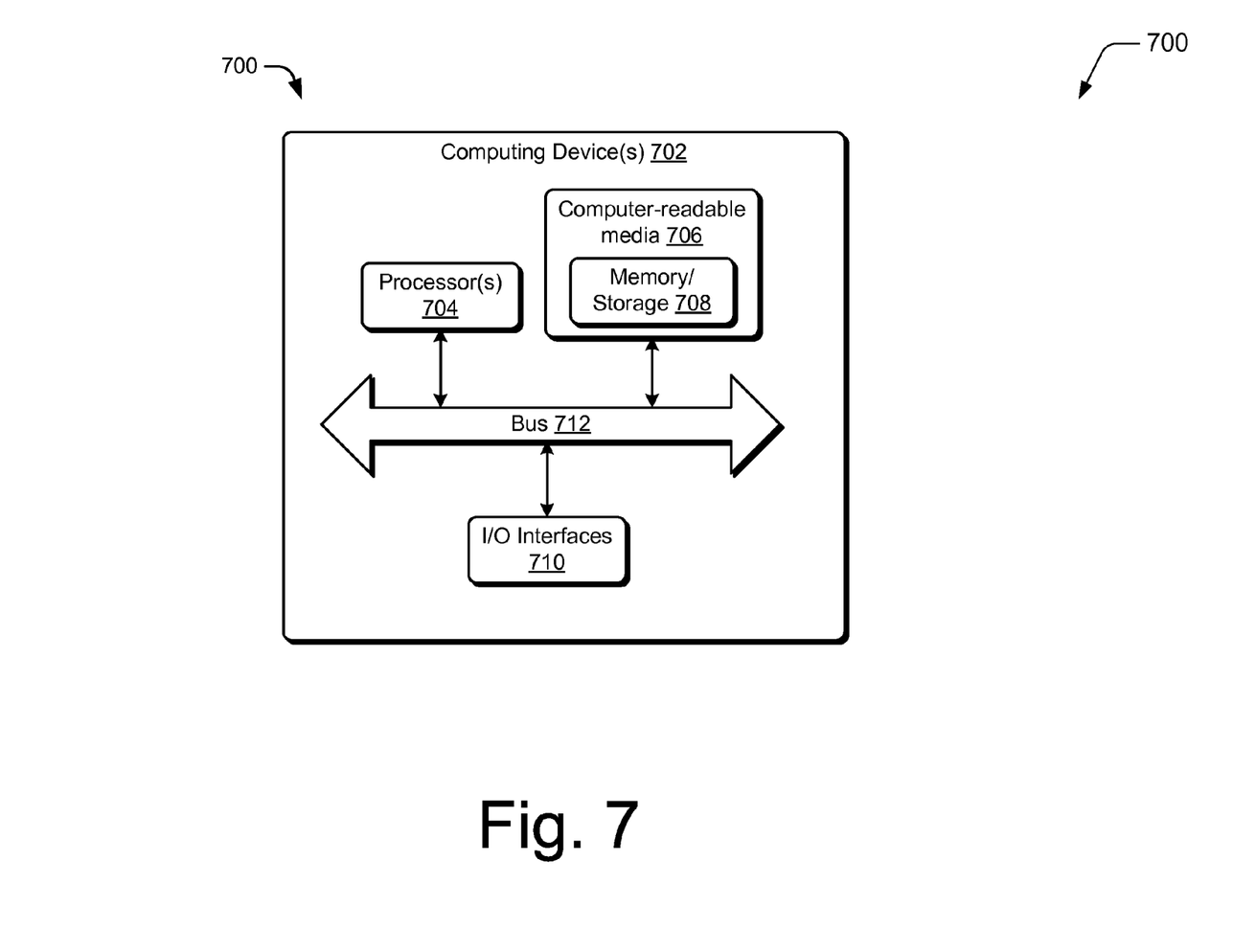
FIG. 7 illustrates an example system that can be used to implement one or more embodiments.

FIG. 7 illustrates an example system generally at 700 that includes an example computing device 702 that is representative of one or more such computing systems and/or devices that may implement the various embodiments described above. The computing device 702 may be, for example, a server of a service provider 114, a device associated with the computing device 102 (e.g., a client device), a server that provides and application service 128, a system on-chip, and/or any other suitable computing device or computing system.

The example computing device 702 includes one or more processors 704 or processing units, one or more computer-readable media 706 which may include one or more memory and/or storage components 708, one or more input/output (I/O) interfaces 710 for input/output (I/O) devices, and a bus 712 that allows the various components and devices to communicate one to another. Computer-readable media 706 and/or one or more I/O devices may be included as part of, or alternatively may be coupled to, the computing device 702. The bus 712 represents one or more of several types of bus structures, including a memory bus or memory controller, a peripheral bus, an accelerated graphics port, and a processor or local bus using any of a variety of bus architectures. The bus 712 may include wired and/or wireless buses.

The one or more processors 704 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 708 represents memory/storage capacity associated with one or more computer-readable media. The memory/storage component 708 may include volatile media (such as random access memory (RAM)) and/or nonvolatile media (such as read only memory (ROM), Flash memory, optical disks, magnetic disks, and so forth). The memory/storage component 708 may include fixed media (e.g., RAM, ROM, a fixed hard drive, etc.) as well as removable media (e.g., a Flash memory drive, a removable hard drive, an optical disk, and so forth).

Input/output interface(s) 710 allow a user to enter commands and information to computing device 702, and also allow information to be presented to the user and/or other components or devices using various input/output devices. Examples of input devices include a keyboard, a touchscreen display, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the APIs, notification service 124, operating system 110, applications 108, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 702 may be configured to implement particular instructions and/or functions corresponding to the software and/or hardware modules implemented on computer-readable media. The instructions and/or functions may be executable/operable by one or more articles of manufacture (for example, one or more computing devices 702 and/or processors 704) to implement techniques for stateless application notifications, as well as other techniques. Such techniques include, but are not limited to, the example procedures described herein. Thus, computer-readable media may be configured to store or otherwise provide instructions that, when executed by one or more devices described herein, cause various techniques for stateless application notifications.

CONCLUSION

Stateless application notifications have been described by which obfuscated routing data in the form of a channel handle and/or token can be employed to send notifications through a notification service. The routing data can be encrypted and digitally signed to obscure the content and format of the routing data from third parties. An application service possessing the obfuscated routing data can package a notification with the data and send the package to the notification service for delivery. The notification service is configured to decrypt and interpret the data, and deliver the notification to an appropriate endpoint on behalf of the application service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processors; and
memory storing instructions that, responsive to execution by the one or more processors, causes a notification service to perform acts comprising:
establishing a communication channel with a client application to deliver notifications between an application service and the client application;
generating obfuscated routing data for the communication channel to be used by the application service to direct notifications on the communication channel for the client application through the notification service, the obfuscated routing data not being interpretable by the application service and the client application, the content of the obfuscated routing data being controlled by the notification service;
obtaining a notification packaged with the obfuscated routing data from the application service, the obfuscated routing data encoding a pathway of the communication channel that can be ascertained by the notification service from the obfuscated routing data in process and without looking-up cached state data for the communication channel; and
interpreting the obfuscated routing data to identify the communication channel and direct the notification obtained from the application service to the client application.

2. The system of claim 1, wherein the obfuscated routing data includes a channel handle that is derived as an abstraction of an address of the communication channel.

3. The system of claim 1, wherein the obfuscated routing data includes a token formatted to carry routing data interpretable by the notification service to direct notifications sent in association with the token on the communication channel.

4. The system of claim 1 further comprising securing the communication channel by encrypting and digitally signing the obfuscated routing data.

5. The system of claim 1 further comprising de-authorizing the obfuscated routing data without affecting the communication channel.

6. The system of claim 1, wherein establishing the communication channel includes assigning a channel identifier as a persistent globally unique address between the notification service and the client application.

7. The system of claim 1, wherein generating the obfuscated routing data includes constructing a channel handle for the communication channel in response to a request from the client application based upon state data cached at the client and provided in the request.

8. The system of claim 7, wherein the channel handle is constructed as a uniform resource identifier (URI) that encodes a combination of the client application, a client device, and a user of the client device.

9. The system of claim 1, wherein interpreting the obfuscated routing data includes:
decrypting the obfuscated routing data;
checking an expiration time to verify validity of the decrypted routing data;
authenticating the application service to send notifications based on a comparison of credentials embedded within the obfuscated routing data to credentials used by the application service to sign-in; and
processing the decrypted routing data to identify the communication channel for the notification.

10. A computer implemented method comprising:
initiating, by a client, creation of a channel to provide notifications from an application service to an application of the client;
requesting, by the client and via a network, a channel handle for the channel from a notification service, the channel handle encoding routing data interpretable by the notification service in process and without looking-up cached state data for the channel to direct notifications on the channel to the application of the client, the content of the routing data being controlled by the notification service;
caching at the client a channel handle returned by the notification service in response to the requesting;
providing, by the client and via the network, the channel handle returned by the notification service to the application service to enable the application service to use the channel handle to route notifications to the client, the routing data of the channel handle not being interpretable by the application service and the application of the client; and
receiving at the client a notification on the channel from the notification service, the notification packaged with the routing data at the application service to cause the notification service to direct the notification on the channel to the client.

11. The computer implemented method of claim 10, wherein the channel handle includes a uniform resource identifier (URI) that encodes a combination of identifiers for the application, the client device, and a user of the client.

12. The computer implemented method of claim 10, wherein the client is configured to request multiple channel handles for the same channel from the notification service at least some of which are active at the same time to enable:

continuity of notifications from the application service to the client; and de-authorizing of expired and compromised channel handles for the channel without having to establish a new channel between the client and application service to provide subsequent notifications.

13. The computer implemented method of claim 10, further comprising:

requesting, by the client, renewal of the channel handle that is cached by the client before an expiration time associated with the channel handle; and obtaining another channel handle issued for the channel by the notification service in response to the request.

14. A computer implemented method comprising:

establishing a communication channel with a client application to deliver notifications between an application service and the client application;

generating obfuscated routing data for the communication channel to be used by the application service to direct notifications on the communication channel for the client application through the notification service, the obfuscated routing data not being interpretable by the application service and the client application, the content of the obfuscated routing data being controlled by the notification service;

obtaining a notification packaged with the obfuscated routing data from the application service, the obfuscated routing data encoding a pathway of the communication channel that can be ascertained by the notification service from the obfuscated routing data in process and without looking-up cached state data for the communication channel; and interpreting the obfuscated routing data to identify the communication channel and direct the notification obtained from the application service to the client application.

15. The computer implemented method of claim 14, wherein the obfuscated routing data includes a channel handle that is derived as an abstraction of an address of the communication channel.

16. The computer implemented method of claim 14, wherein the obfuscated routing data includes a token formatted to carry routing data interpretable by the notification service to direct notifications sent in association with the token on the communication channel.

17. The computer implemented method of claim 14, further comprising securing the communication channel by encrypting and digitally signing the obfuscated routing data.

18. The computer implemented method of claim 14, further comprising de-authorizing the obfuscated routing data without affecting the communication channel.

19. The computer implemented method of claim 14, wherein generating the obfuscated routing data includes constructing a channel handle for the communication channel in response to a request from the client application based upon state data cached at the client and provided in the request.

20. The computer implemented method of claim 19, wherein the channel handle is constructed as a uniform resource identifier (URI) that encodes a combination of the client application, a client device, and a user of the client device.

* * * * *